United States Patent [19]
Tomiyama

[11] Patent Number: 5,355,661
[45] Date of Patent: Oct. 18, 1994

[54] LAWN MOWER HAVING A STEERING HANDLE SWITCHABLE BETWEEN A WALKING MODE AND A RIDING MODE

[75] Inventor: Yoshio Tomiyama, Sakai, Japan
[73] Assignee: Kubota Corporation, Osaka, Japan
[21] Appl. No.: 62,016
[22] Filed: May 17, 1993
[30] Foreign Application Priority Data May 25, 1992 [JP] Japan ............................ 4-34264[U]
Sep. 30, 1992 [JP] Japan ............................ 4-260926

[51] Int. Cl.⁵ ...................... A01D 34/68; B62D 11/04
[52] U.S. Cl. ...................... 56/10.8; 56/11.1;
  56/DIG. 18; 56/DIG. 22; 180/6.48
[58] Field of Search ............ 56/10.8, 11.1, 11.8,
  56/DIG. 18, DIG. 11, DIG. 22, 16.7; 180/6.48

[56] References Cited
U.S. PATENT DOCUMENTS

| | | |
|---|---|---|
| 4,934,989 | 6/1990 | Furukawa et al. ............... 474/135 |
| 4,957,183 | 9/1990 | Mullett et al. ................... 180/234 |
| 5,239,810 | 8/1993 | Gugel ............................... 56/10.8 |
| 5,247,784 | 9/1993 | Kitamura et al. ............. 180/6.48 X |

*Primary Examiner*—David J. Bagnell
*Attorney, Agent, or Firm*—Webb Ziesenheim Bruening Logsdon Orkin & Hanson

[57] ABSTRACT

A lawn mower for use in a walking mode and a riding mode. Drive of an engine is transmitted in varied speeds to rear drive wheels through stepless transmissions. The transmissions are controllable a first shift member accessible to a driver walking behind the lawn mower, and a second shift member accessible to the driver seated on a driver's seat. Operation of one of the shift members is prohibited when the other shift member is operative. The first shift member is connected to the transmissions through a drive link, a driven link, and a pin removably inserted into bores formed in the two links. A prohibiting device is movable to a position to prevent the pin from extending into one of the bores.

7 Claims, 6 Drawing Sheets

LAWN MOWER HAVING A STEERING HANDLE SWITCHABLE BETWEEN A WALKING MODE AND A RIDING MODE

BACKGROUND OF THE INVENTION

1. Field of the Invention

The present invention relates to a lawn mower for use in a walking operator mode and a riding operator mode.

2. Description of the Related Art

A riding type lawn mower, as disclosed in U.S. Pat. No. 4,957,183, has an engine mounted on a front portion of a vehicle body, a driver's section disposed rearwardly, and a grass cutting unit underslung between front and rear wheels. The mower runs on the wheels driven respectively by hydraulic motors, and is steerable by turning the wheels up to about 90 degrees with a steering wheel disposed in the center and forwardly of a driver's seat.

The riding type lawn mower having the above construction is capable of a small, sharp turn with the center of turning moved to a position inwardly of a peripheral edge of the grass cutting unit. This turning capability provides the advantage of realizing an efficient grass cutting operation leaving no uncut patches. However, since the engine is mounted forwardly of the driver's section, the mower has an extensive fore and aft length. Consequently, the driver has difficulties in observing grass patches ahead of the mower during a grass cutting run. In addition, when boarding and alighting from the mower, the driver has the inconvenience of having to move through a narrow space between the driver's seat and steering wheel.

In the case of walking operator type lawn mower, one known example, as disclosed in U.S. Pat. No. 4,934,989, has a grass cutting unit mounted between caster type front wheels and engine-driven rear wheels, and control levers extending rearwardly for a walking operator to steer the mower. This lawn mower is easily controllable by operating transmission clutches provided for the rear wheels, respectively. It is possible to drive the mower along a complicated curve to engage in a grass cutting operation. However, when the mower is caused to run along a long straight line, the operator must follow the mower in a tedious walk. The walking operator type lawn mower has a low reputation for use in an operation involving such long straight walks.

As further examples, Applicants have disclosed lawn mowers for use in a walking mode as well as a riding mode, in U.S. patent applications Ser. No. 07/865,726 filed Apr. 8, 1992 now U.S. Pat. No. 5,247,784 and Ser. No. 07/874,647 filed Apr. 27, 1992. In each of these mowers, front control levers disposed adjacent a driver's seat and rear control levers arranged rearwardly of a vehicle body are operatively connected to transmissions for varying drive speeds of tight and left rear wheels, respectively. The user may freely choose to use this type of lawn mower in the walking mode or in the riding mode.

The same applicants have disclosed a further example of such lawn mowers in U.S. patent application Ser. No. 07/031,250 filed Mar. 12, 1993. This lawn mower has a handle post for controlling transmissions to vary speeds of drive wheels, the handle post being pivotable between a first position for the walking mode and a second position for the riding mode. According to this construction, when the operator steers the mower while walking behind it, the handle post is set to the first or walking control position, with control levers disposed rearwardly and upwardly of the mower. When the operator rides the mower, the handle post is set to the second or riding control position, with the control levers disposed adjacent a driver's seat.

SUMMARY OF THE INVENTION

The object of the present invention is to provide a control system with increased reliability for a lawn mower usable in a walking mode and a riding mode.

The above object is fulfilled, according to the present invention, by a lawn mower for use in a walking mode and a riding mode, comprising a shift member for use in the walking mode, and a shift member for use in the riding mode, the two shift members being selectively connectable to transmissions for varying speeds of drive wheels. A prohibiting device is provided to prohibit operation of the shift member for the riding mode when the shift member for the walking mode is operative, and vice versa.

The above construction has independent shift members for use in the riding mode and in the walking mode. A highly reliable control system is achieved in that operation of one of the shift members is prohibited when the other is operative.

Other features and advantages of the present invention will be apparent from the following description of the preferred embodiments of the invention taken with reference to the accompanying drawings.

DETAILED DESCRIPTION OF THE PREFERRED EMBODIMENTS

Embodiments of the present invention will be described hereinafter with reference to the drawings.

Figure 1:
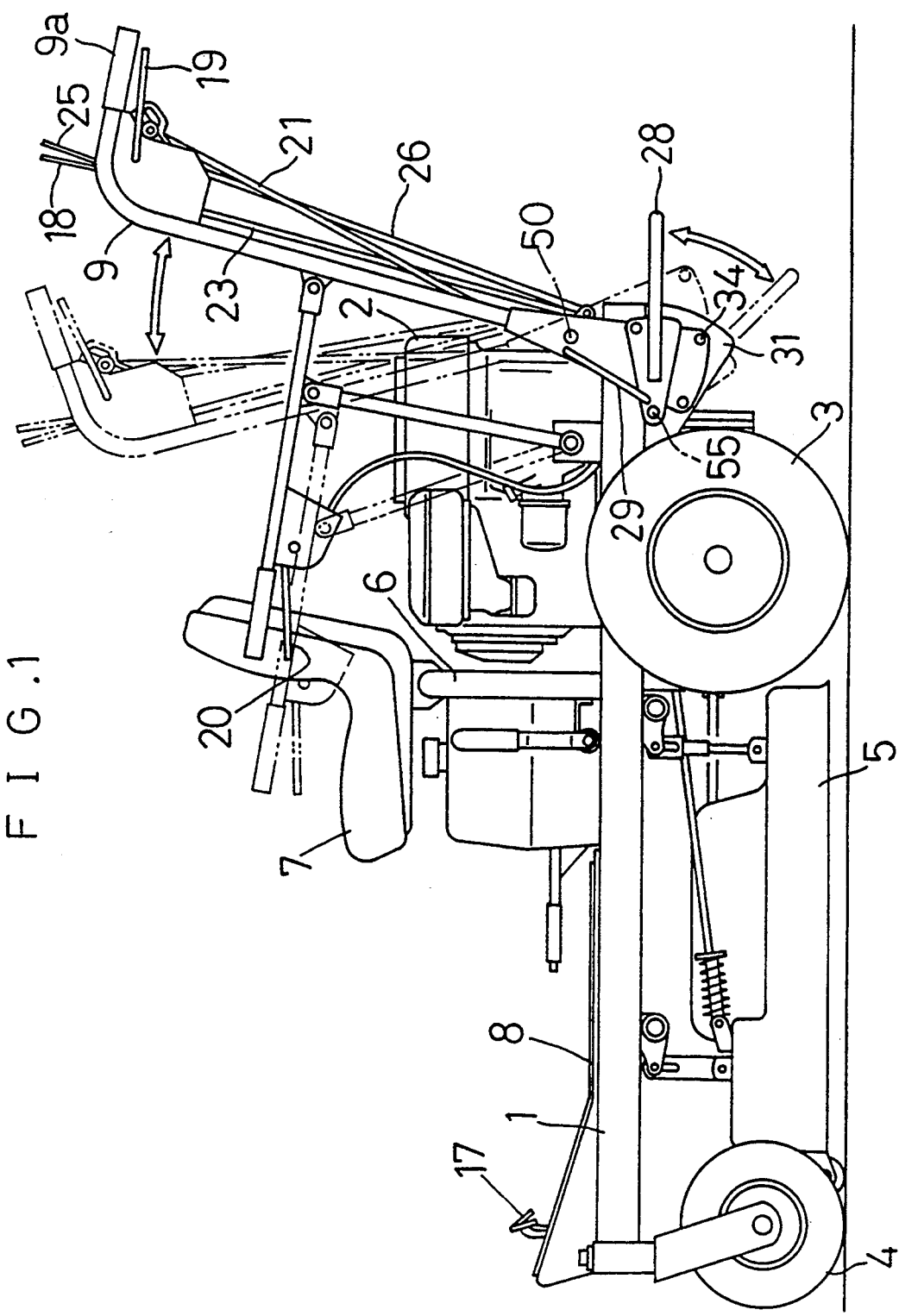
FIG. 1 is a side elevation of a lawn mower according to the present invention.

FIG. 1 shows a lawn mower having a chassis frame 1 extending longitudinally thereof. The chassis frame 1 supports an engine 2 mounted rearwardly thereof. Right and left rear drive wheels 3 are disposed below the engine 2, and caster type right and left front wheels 4 are disposed at a forward end of the chassis frame 1. A grass cutting unit 5 is underslung between the front wheels 4 and rear wheels 3 to be vertically adjustable relative to the chassis frame 1. A driver's seat 7 is supported on a support member 6 erected on the chassis frame 1 forwardly of the engine 2. Only a floor step 8 is provided forwardly of the driver's seat 7, so that a seated driver may have a good forward view. The floor step 8 has a change speed pedal 17 for the seated driver to effect a change speed operation. A steering handle 9 extends rearwardly and upwardly from a rear position of the chassis frame 1 for the driver to effect a change speed operation while walking behind the mower.

Figure 2:
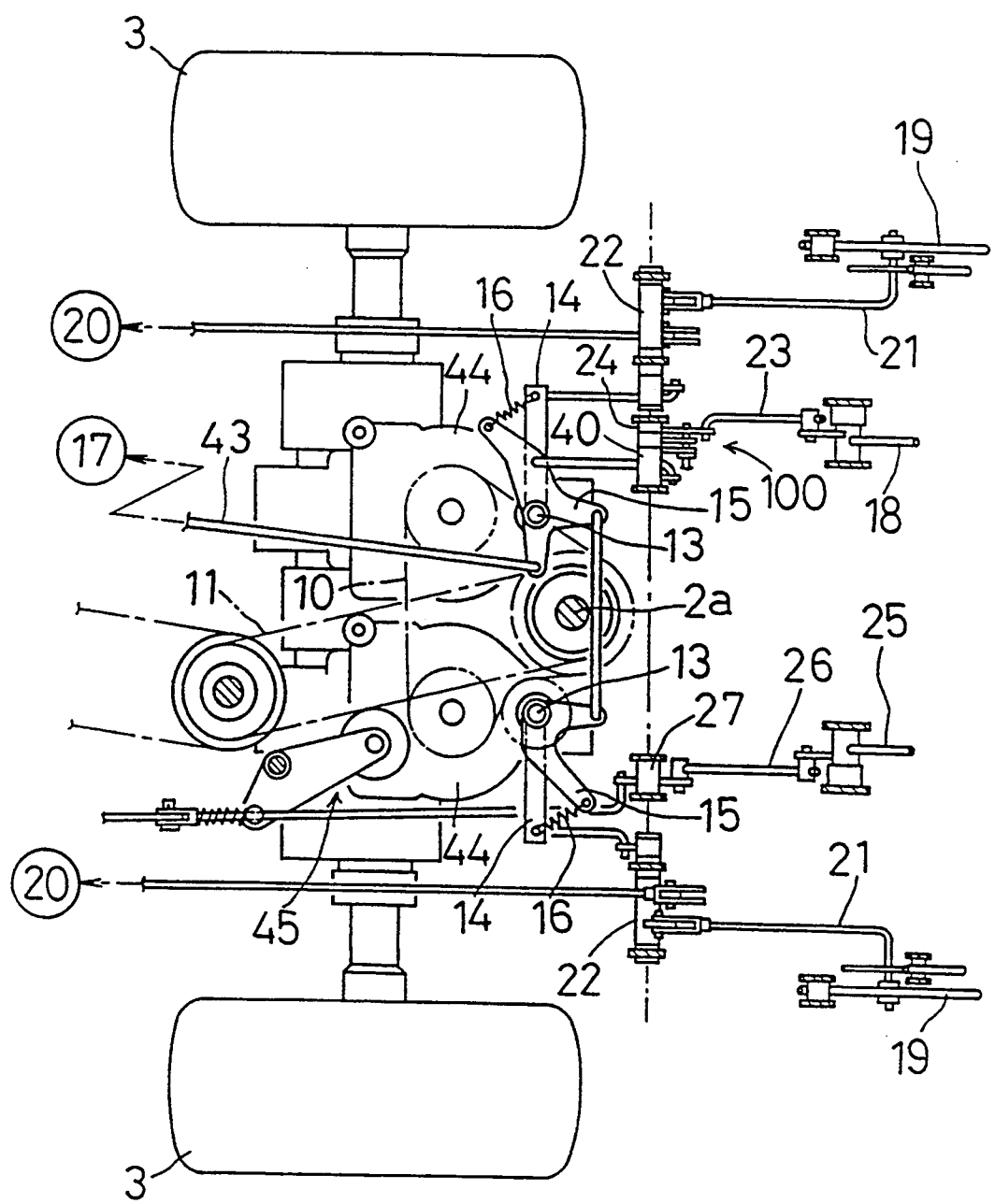
FIG. 2 is a plan view of a speed control system.

Referring to FIG. 2, the mower has a transmission system for transmitting power from a vertical output shaft 2a of the engine 2 to a pair of right and left hydrostatic stepless transmissions 44 through a transmission belt 10, and to the grass cutting unit 5 through a belt transmission mechanism 11. The rear wheels 3 are driven individually by the right and left hydrostatic stepless transmissions 44. The transmissions 44 are controllable from a riding control region around the driver's seat 7 and from a walking control region rearwardly of the vehicle body.

Each stepless transmission 44 has a shift control shaft 13 rotatable with pivotal movement of a shift arm 14 mounted thereon, and a control arm 15 mounted on the shift control shaft 13 to be pivotable relative thereto. The shift arm 14 and control arm 15 are interlocked through a spring 16 to follow movement of each other. The control arm 15 is controllably interlocked to the change speed pedal 17 in the riding control region and to a change speed lever 18 in the walking control region. An operation of the change speed pedal 17 or change speed lever 18 causes the control arms 15 to pivot together from a neutral position in a forward accelerating direction of the hydrostatic stepless transmissions 44. The shift arms 14 also make pivotal movement following the pivotal movement of the control arms 15 through the springs 16. As a result, the right and left rear wheels 3 are accelerated to substantially the same forward speed. The springs 16 act also to return the control arms 15 to the neutral position.

Each shift arm 14 is operable, when the driver grips one of right and left control levers 19 included in a gripping control section 9a of the steering handle 9 or grips one of control levers 20 included in the riding control region, to pivot from the neutral position in a decelerating direction of the hydrostatic stepless transmission 44. When, for example, the driver grips one of the control levers during a straight forward run caused by operation of the change speed lever 18, the shift arm 14 interlocked to the control lever gripped is operated in the decelerating direction against the spring load. This causes the mower to make a turn. When the control levers 19 or 20 are gripped hard in a neutral condition, the mower is driven backward. The change speed lever 18 is retainable in a desired control position by a frictional retainer such as a belleville spring mounted in an interlocking line thereof.

The grip control levers 19 in the walking control region are interlocked to the shift arms 14 through interlocking links 21 and relay members 22 rotatable about a transverse axis, respectively. Similarly, the change speed lever 18 is interlocked to the control arms 15 through an interlocking link 23 and a rotatable relay member 24. The change speed pedal 17 in the riding control region is interlocked to the control arms 15 through a rod 43. The walking control region further includes a control lever 25 interlocked through an interlocking link 26 and a rotatable relay member 27 to a belt tension clutch 45 of the grass cutting unit 5. The relay members 22, 24 and 27 are rotatable about the same axis. Such interlock mechanisms are described in detail in U.S. patent application Ser. No. 07/865,726 noted hereinbefore.

Figure 3:
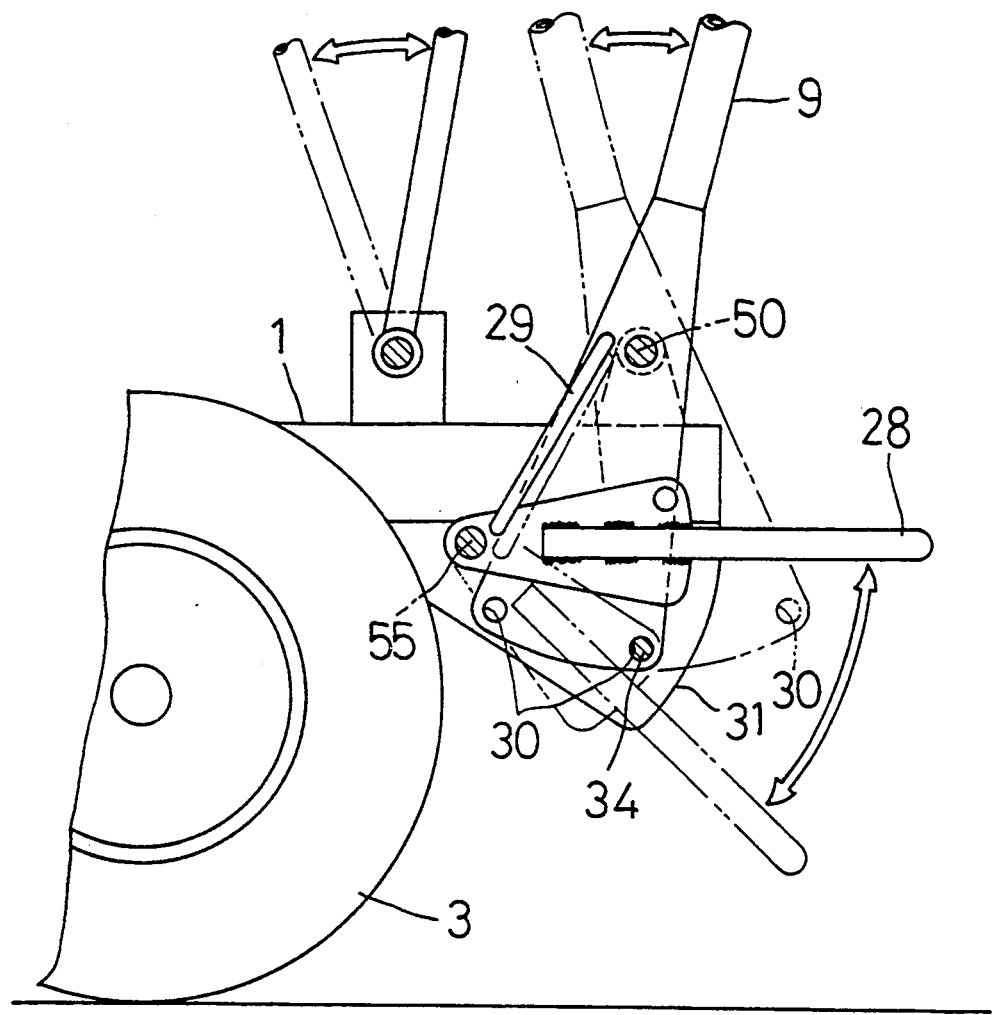
FIG. 3 is a side view of a rear region of a vehicle body showing a lower portion of a steering handle and an auxiliary frame.

The mower further includes an auxiliary frame 28 disposed rearwardly of the chassis frame 1 to act as protection for the vehicle body particularly in the riding mode. The auxiliary frame 28 is pivotable between a lower operative position and an upper inoperative contained position. The steering handle 9 is pivotable between a walking control position extending rearwardly and upwardly from the vehicle body, and a contained riding control position retracted forwardly of the vehicle body. Specifically, as shown in FIG. 3, the steering handle 9 is connected at proximal ends thereof to the chassis frame 1 to be pivotable about cross axes 50. The auxiliary frame 28 is connected at opposite, right and left ends thereof to the chassis frame 1 to be pivotable about cross axes 55 disposed below and forwardly of the axes 50 of the steering handle 9. As seen from FIG. 4, the auxiliary frame 28 has a looped configuration in plan view. The steering handle 9 and auxiliary frame 28 are interlocked at the proximal ends through interlocking rods 29, so that the auxiliary frame 28 is pivotable with pivotal movement of the steering handle 9. Thus, the auxiliary frame 28 is pivotable from the upper contained position to the lower operative position as the steering handle 9 pivots from the walking control position to the riding control position.

Figure 5:
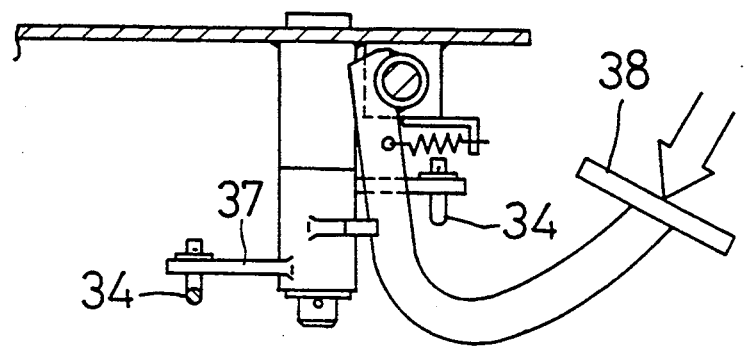
FIG. 5 is a side view of a steering handle switching pedal.
Figure 4:
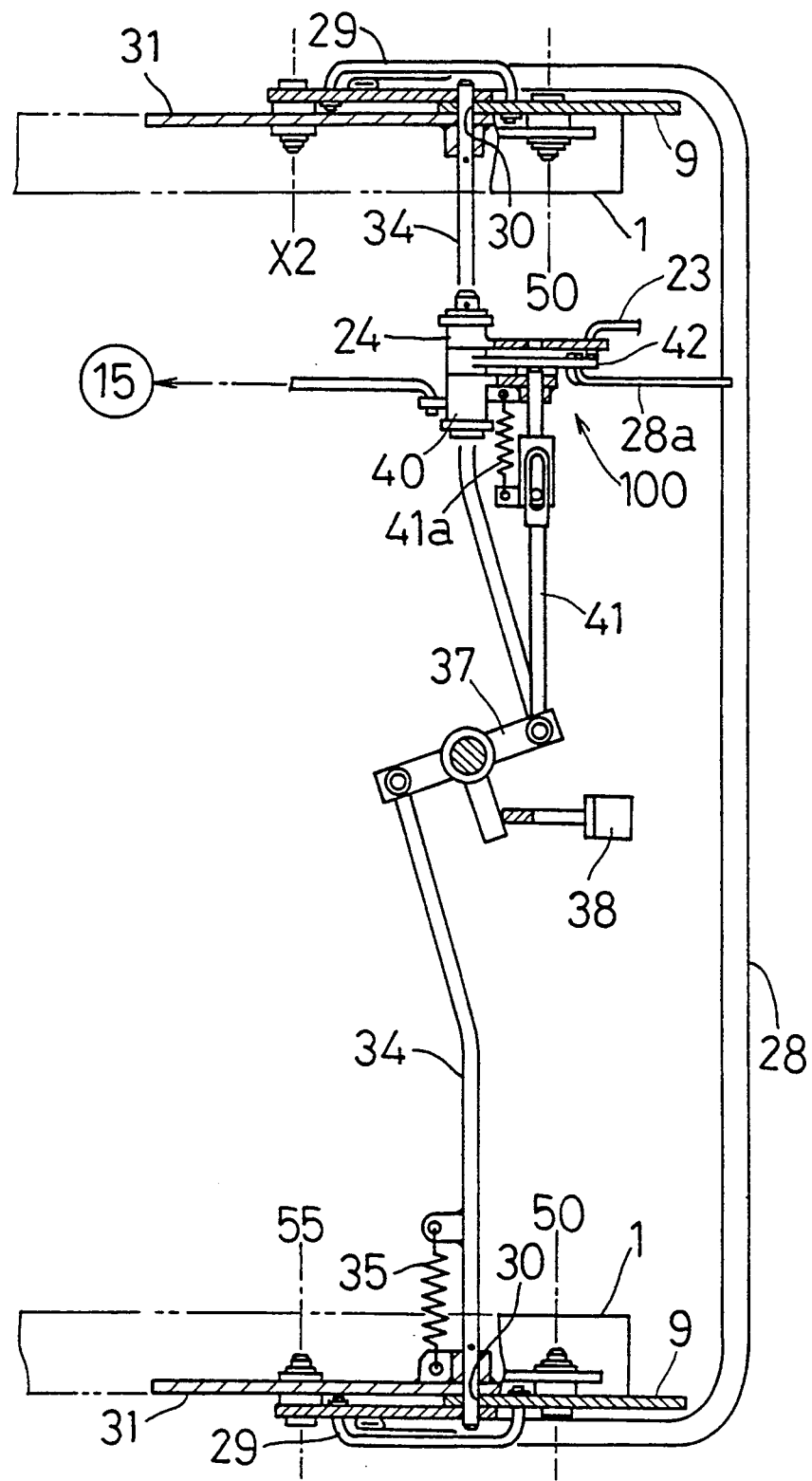
FIG. 4 is a plan view of the rear region of the vehicle body showing the lower portion of the steering handle and the auxiliary frame.

The steering handle 9 defines two pin receiving bores 30 arranged one forwardly of the other in each of right and left lower end regions thereof. An engaging rod 34 may be inserted through one of the pin receiving bores 30 and a pin receiving bore formed in a bracket 31 secured to the chassis frame 1, to fix the steering handle 9 in one of the above control positions. As shown in FIGS. 4 and 5, each engaging rod 34 is biased toward an engaging position by a spring 35. The two engaging rods 34 are pivotally connected to a seesaw arm 37 pivotable about a vertical axis provided in a middle position transversely of the vehicle body. The seesaw arm 37 is pivotable by a pedal 38 to draw the right and left engaging rods 34 out of the pin receiving bores 30, thereby to allow switching of the steering handle 9. The auxiliary frame 28 may be fixed to the lower operative position by the engaging rods 34 inserted in place.

Figure 6:
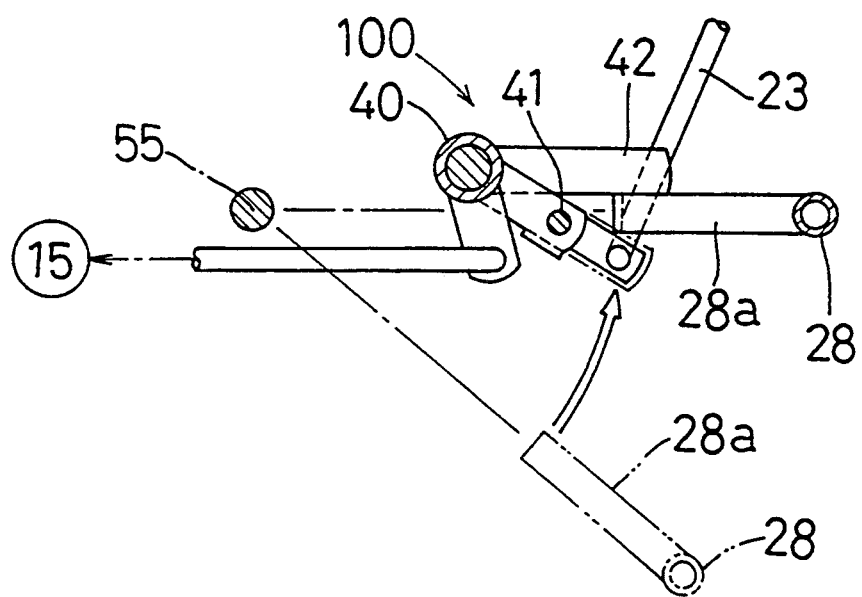
FIG. 6 is a side view of a control prohibiting device.

An important aspect of the present invention lies in that a control prohibiting device 100 is provided for disabling a shifting operation by the change speed lever 18 in the walking control region when switching is made from the walking control mode to the riding control mode. As shown in FIGS. 4 and 6, a pin 41 is extendible into and retractable out of engagement with the rotatable relay member 24 interlocked to the change speed lever 18 and a rotatable relay member 40 interlocked to the control arms 15. The rotatable relay members 24 and 40 are rotatable together when the pin 41 is extended into engagement therewith, and are disconnected from each other when the pin 41 is retracted out of engagement. The pin 41 is extendible and retractable with movement of the engaging rods 34, and is biased to the engaging position by a spring 41a. A barrier member 42 is disposed between the rotatable relay members 24 and 40 to be pivotable between a position to allow extension of the pin 41 and a position to prevent it. In the walking control mode, the barrier member 42 is retained in an upper contained position by an arm 28a formed on the auxiliary frame 28, to allow extension into engagement of the pin 41. When the auxiliary frame 28 is switched to the lower operative position for the riding control mode, the barrier member 42 becomes free from the upward retaining action of the arm 28a, and pivots downward by gravity to the position to prevent the extension of the pin 41. Consequently, a change speed operation does not take place when the change speed lever 18 in the walking control region is operated when the riding mode is established.

Figure 7:
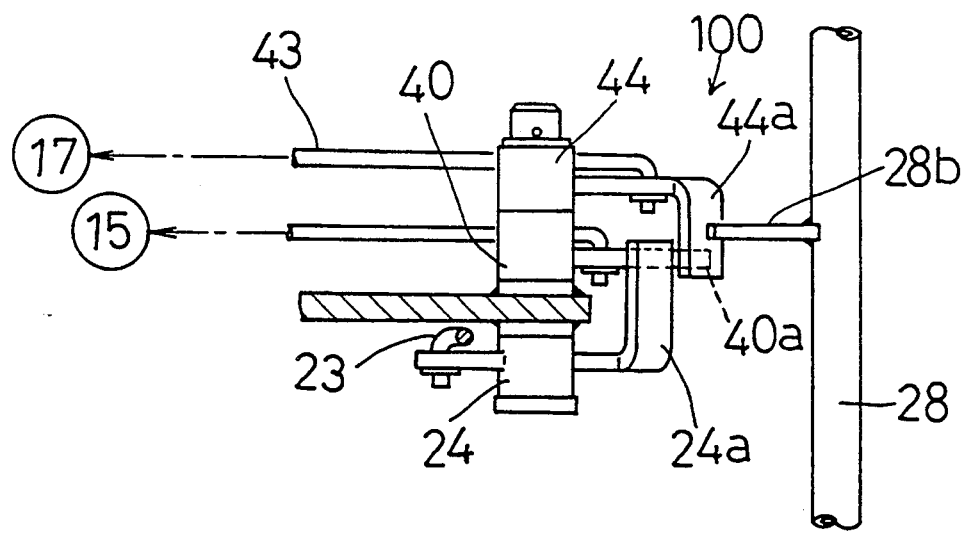
FIG. 7 is a plan view of a control prohibiting device in a further embodiment.
Figure 8:
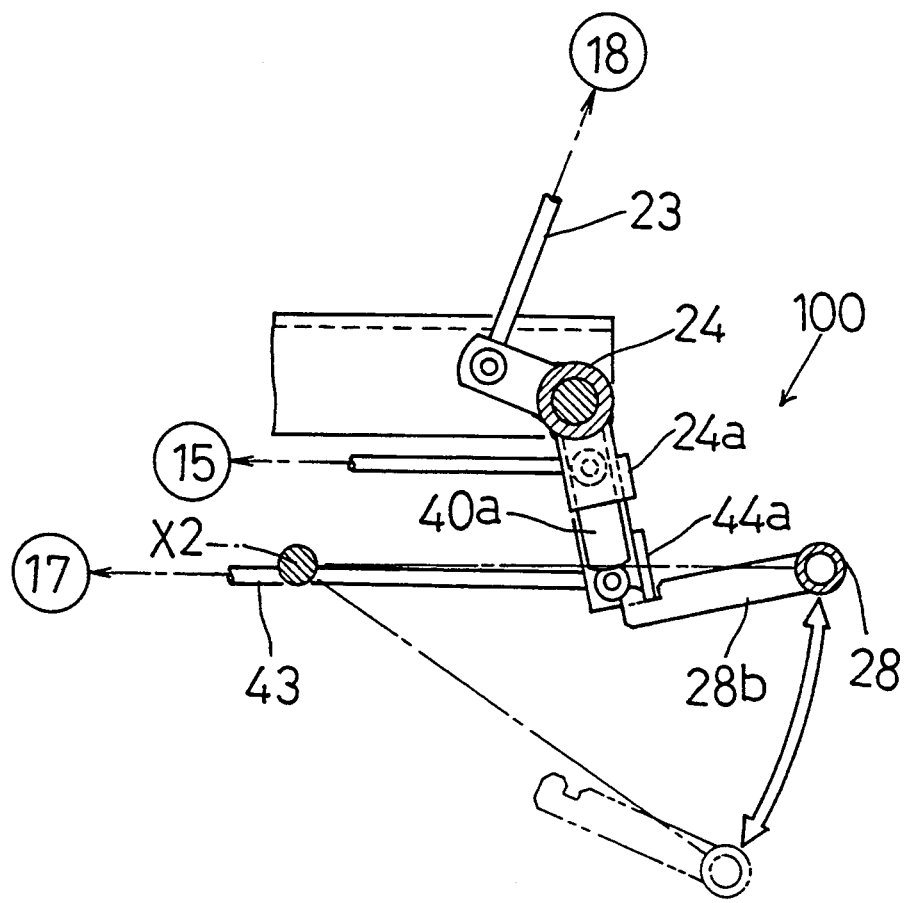
FIG. 8 is a side view of the control prohibiting device in the further embodiment.

The control prohibiting device 100 may be adapted operable to disable a shifting operation by the change speed pedal 17 in the riding control region when in the walking mode, instead of disabling a shifting operation by the change speed lever 18 in the walking control region when in the riding mode. In this case, as shown in FIGS. 7 and 8, the pedal 17 has an interlocking rod 43 connected to a rotatable relay member 44. This relay member 44 is opposed to the rotatable relay member 24 interlocked to the change speed lever 18, across the rotatable relay member 40 interlocked to the control arms 15. The rotatable relay members 44 and 24 are rotatable relative to each other, and define contact portions 44a and 24a, respectively. The contact portions 44a and 24a are selectively engageable with an arm 40a of the rotatable relay member 40 interlocked to the control arms 15 to effect acceleration. The auxiliary frame 28 includes an engaging portion 28b which, when the walking mode is selected, engages the contact portion 44a of the rotatable relay member 44 interlocked to the change speed pedal 17, to prevent rotation of the relay member 44. Thus, in the walking mode, the change speed pedal 17 in the riding control region is rendered inoperative.

It is possible within the scope of the present invention to combine the two prohibiting devices, thereby to render the change speed lever 18 inoperative in the riding control mode, the change speed pedal 17 inoperative in the walking control mode.

What is claimed is:

1. A lawn mower for use in a walking mode and a riding mode, comprising:
   a chassis frame;
   an engine mounted on a rearward position of said chassis frame;
   at least one front wheel;
   driven rear wheel means;
   transmission means for transmitting drive from said engine to said rear wheel means, said transmission means including change speed means for changing speed of said rear wheel means;
   a grass cutting unit suspended from said chassis frame;
   a driver's seat mounted on said chassis frame; and
   control means interlocked to said change speed means for controlling said change speed means, said control means including:
   a first shift member accessible to a driver walking behind the lawn mower;
   a second shift member accessible to the driver seated on said driver's seat; and
   prohibit means for prohibiting operation of one of said shift members when the other shift member is operative.

2. A lawn mower as defined in claim 1, wherein said control means further includes a drive link and a driven link interlocking said first shift member and said change speed means, said prohibit means including a member for selectively connecting and disconnecting said drive link and said driven link.

3. A lawn mower as defined in claim 2, wherein said member of said prohibit means includes a pin for extending into a bore formed in said drive link and a bore formed in said driven link, and a barrier movable between a first position to prevent extension of said pin and a second position to enable the extension.

4. A lawn mower as defined in claim 3, wherein said control means includes a displaceable member displaceable with switching between said riding mode and said walking mode, said barrier being movable between said first position and said second position with displacement of said displaceable member.

5. A lawn mower as defined in claim 4, further comprising an auxiliary frame connected to a rear end of said chassis frame to be pivotable between an operative position extending rearwardly and downwardly from said chassis frame and a contained position retracted upwardly of said chassis frame, wherein said auxiliary frame is interlocked to said displaceable member such that said auxiliary frame is movable to said operative position when said control means is set to a riding control state.

6. A lawn mower as defined in claim 1, wherein said displaceable means is in form of a handle post.

7. A lawn mower as defined in claim 1, wherein said control means further includes a drive link and a driven link interlocking said second shift member and said change speed means, said prohibit means including a member for selectively connecting and disconnecting said drive link and said driven link.

* * * * *